US009807815B2

(12) United States Patent
Alpert et al.

(10) Patent No.: US 9,807,815 B2
(45) Date of Patent: Oct. 31, 2017

(54) APPARATUS, SYSTEM AND METHOD OF SIMULTANEOUS CONNECTIVITY TO LOCATION ORIGIN TRANSCEIVERS

(71) Applicant: Intel Corporation, Santa Clara, CA (US)

(72) Inventors: Yaron Alpert, Hod Hasharon (IL); Gil Zukerman, Hod-HaSharon (IL)

(73) Assignee: INTEL CORPORATION, Santa Clara, CA (US)

( * ) Notice: Subject to any disclaimer, the term of this patent is extended or adjusted under 35 U.S.C. 154(b) by 984 days.

(21) Appl. No.: 13/710,652

(22) Filed: Dec. 11, 2012

(65) Prior Publication Data

US 2014/0160951 A1 Jun. 12, 2014

(51) Int. Cl.
| | |
|---|---|
| *H04W 84/12* | (2009.01) |
| *H04W 64/00* | (2009.01) |
| *G01S 5/02* | (2010.01) |
| *G01S 5/14* | (2006.01) |
| *H04W 76/02* | (2009.01) |
| *H04W 4/02* | (2009.01) |

(52) U.S. Cl.
CPC ............ *H04W 84/12* (2013.01); *G01S 5/02* (2013.01); *G01S 5/14* (2013.01); *H04W 64/00* (2013.01); *H04W 4/02* (2013.01); *H04W 76/025* (2013.01)

(58) Field of Classification Search
CPC ... H04W 84/12; H04W 64/00; H04W 76/025; G01S 5/14; G01S 5/02
See application file for complete search history.

(56) References Cited

U.S. PATENT DOCUMENTS

| | | | |
|---|---|---|---|
| 5,588,121 A | 12/1996 | Reddin et al. | |
| 7,403,762 B2 | 7/2008 | Morgan et al. | |
| 8,417,264 B1* | 4/2013 | Whitney | H04W 64/00 455/456.1 |
| 2008/0095131 A1* | 4/2008 | Aljadeff | H04W 56/0075 370/342 |
| 2009/0180444 A1* | 7/2009 | McManus et al. | 370/332 |

(Continued)

FOREIGN PATENT DOCUMENTS

| | | |
|---|---|---|
| WO | 2007075854 | 7/2007 |
| WO | 2011053827 | 5/2011 |

(Continued)

OTHER PUBLICATIONS

International Search Report and Written Opinion for PCT Application No. PCT/US2013/048078, dated Sep. 30, 2013, 11 pages.

(Continued)

*Primary Examiner* — Edan Orgad
*Assistant Examiner* — Jeremy Costin
(74) *Attorney, Agent, or Firm* — Shichrur & Co.

(57) ABSTRACT

Some demonstrative embodiments include apparatuses, systems and/or methods of simultaneous connectivity to location origin transceivers. For example, a transceiver may be configured to simultaneously maintain a plurality of simultaneous Media-Access-Control (MAC) layer connections with a plurality of location origin beacon transceivers (LOBTs), and to communicate wireless communication signals with the plurality of LOBTs via the plurality of simultaneous MAC-layer connections.

15 Claims, 6 Drawing Sheets

(56) References Cited

U.S. PATENT DOCUMENTS

| | | | | |
|---|---|---|---|---|
| 2010/0296441 | A1* | 11/2010 | Barkan | H04W 12/08 |
| | | | | 370/328 |
| 2011/0021210 | A1* | 1/2011 | Medapalli | G01S 5/0205 |
| | | | | 455/456.2 |
| 2011/0149910 | A1* | 6/2011 | Ahn et al. | 370/331 |
| 2013/0176869 | A1* | 7/2013 | Finlow-Bates et al. | 370/252 |

FOREIGN PATENT DOCUMENTS

| | | |
|---|---|---|
| WO | 2012120189 | 9/2012 |
| WO | 2014077907 | 5/2014 |

OTHER PUBLICATIONS

Michael Beigl, et al., "A Location Model for Communicating and Processing of Context", Personal and Ubiquitous Computing, Springer-Verlag London Ltd 2002, pp. 341-357.

International Preliminary Report on Patentability and Written Opinion for International Application No. PCT/US2013/048078, dated Jun. 25, 2015, 8 pages.

Wireless-Gigabit-Alliance (WGA) specifications (Wireless Gigabit Alliance, Inc WiGig MAC and PHY Specification Version 1.0, Final specification), Apr. 2010.

IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks—Specific requirements, Mar. 29, 2012.

OMA Secure User Plane Location Archive, Candidate Version 2.0—May 27, 2011; Open Mobile Alliance OMA-AD-SUPL-V2_0-20110527-C; 54 pages.

Andrei Popescu, Google, Inc. Geolocation API Specfication, W3C Candidate Recommendation Sep. 7, 2010. W3C Geolocation Working Group; 14 pages.

Wi-Fi Alliance Technical Committee P2P Task Group. Wi-Fi Peer-to-Peer (P2P) Technical Specification. Version 1.2; 160 pages; Dec. 14, 2011.

Search Report for European Patent Application No. 13862757.5 dated Jul. 7, 2016, 8 pages.

\* cited by examiner

APPARATUS, SYSTEM AND METHOD OF SIMULTANEOUS CONNECTIVITY TO LOCATION ORIGIN TRANSCEIVERS

BACKGROUND

Continuous location awareness is a highly desirable feature in modern computing devices. This capability is required, for example, to support location-based applications, Contextual Aware Computing and/or a multitude of LES (Location Enabled Services) applications, where each and every one of these applications and services require location updates (either periodic or sporadic/one time).

Various methodologies may be implemented for determining the location of a mobile device. Trilateration is a way of determining location using the locations of a plurality of other devices, generally referred to as location origins, e.g., cellular base stations, Access Points (APs), and the like.

A position calculation method may include measuring wave propagation parameters, e.g., Time of Flight (ToF) parameters, with respect to a location origin; estimating a distance between the mobile device and the location origin based on the measured parameters, and estimating a position, e.g., an absolute location, a movement, or any other position-related attribute, of the mobile device, for example, based on distances between the mobile device and a plurality of location origins, e.g., by trilateration.

Conventional methods of location estimation may not be able to provide a high degree of accuracy and/or continuous location awareness capabilities in an efficient and/or cost-effective manner.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area* networks—Specific requirements Part 11: Wireless LAN Medium Access Control (MAC) and Physical Layer (PHY) Specifications, Mar. 29, 2102; IEEE802.11 task group ac (TGac) ("*IEEE802.11-09/0308r12—TGac Channel Model Addendum Document*"); IEEE 802.11 *task group ad* (*TGad*) (*IEEE P802.11ad/D9.0 Draft Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band*)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.3, 2012) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a transceiver, which is capable of communicating a wireless communication signal, may include a wireless transmitter to transmit the wireless communication signal to at least one wireless communication device, and/or a wireless communication receiver to receive the wireless communication signal from at least one wireless communication device.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 GHz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Figure 1:
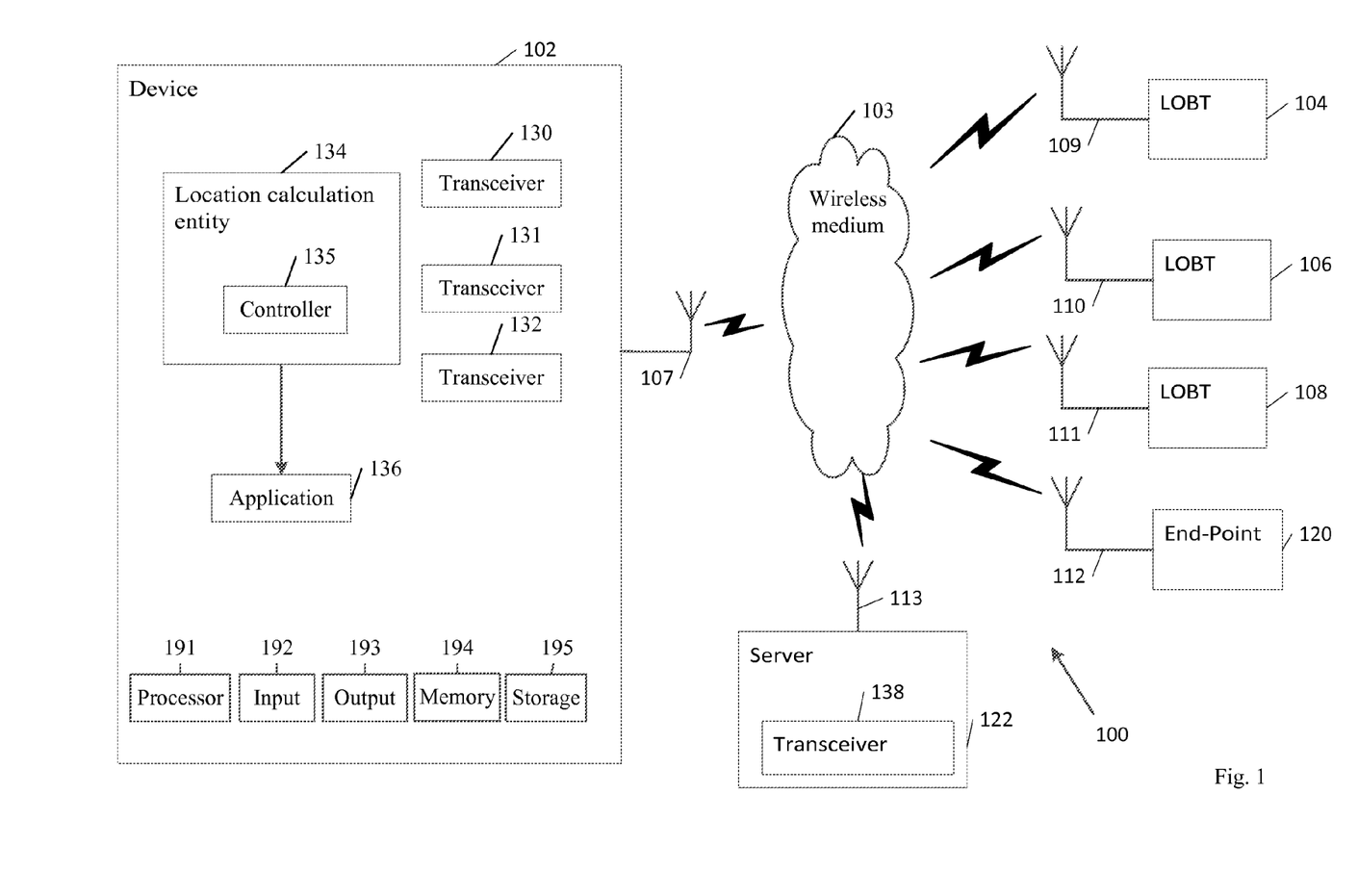
FIG. 1 is a schematic block diagram illustration of a system, in accordance with some demonstrative embodiments.

Reference is now made to FIG. 1, which schematically illustrates a block diagram of a wireless communication system 100, in accordance with some demonstrative embodiments.

In some demonstrative embodiments, system 100 may include a wireless communication device 102 capable of communicating content, data, information and/or signals over one or more wireless communication mediums 103.

In some demonstrative embodiments, device 102 may include, or may be included as part of a mobile or portable device, for example, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication mediums 103 may include for example, a Radio Frequency (RF) channel, a WiFi channel, a Bluetooth channel, a cellular channel, a Global Navigation Satellite System (GNSS) Channel, a Near Field Communication (NFC) channel, a Frequency Modulation (FM) channel, and the like.

In some demonstrative embodiments, device 102 may include a plurality of co-located transceivers, e.g., including transceivers 130, 121 and 132, configured to communicate wireless communication signals via one or more antennas 107. Two or more of transceivers 130, 131 and 132 may utilize a shared common antenna 107 and/or two or more of transceivers 130, 131 and 132 may utilize separate dedicated antennas 107.

In some demonstrative embodiments, antennas 107 may include any type of antennas suitable for transmitting and/or receiving wireless communication signals, blocks, frames, transmission streams, packets, messages and/or data. Types of antennas that may be used for antennas 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, transceivers 130, 131 and/or 132 may include one or more WiFi transceivers, one or more Bluetooth (BT) transceivers, one or more cellular transceivers, e.g., a second generation cellular (2G) transceiver, a third generation cellular (3G) transceiver, a Universal Mobile Telecommunication System (UMTS) transceiver, a Long Term Evolution (LTE) transceiver, one or more NFC transceivers and/or one or more digital radio (DR) transceivers, and the like. For example, transceiver 131 may include at least a WiFi transceiver, transceiver 130 may include at least a cellular transceiver and transceiver 132 may include at least a DR transceiver. In some demonstrative embodiments, transceivers 130, 131 and/or 132 may include any other transceiver.

In some demonstrative embodiments, transceivers 130, 131 and/or 132 may perform he functionality of Device Location Transceivers (DLTs) to communicate wireless communication signals with one or more Location Origin Beacon transceivers (LOBTs), e.g., LOBTs 104, 106 and/or 108.

In some demonstrative embodiments, transceivers 130, 131 and/or 132 may communicate with LOBTs 104, 106 and/or 108 location-estimation information, e.g., as described in detail below.

An LOBT may include, for example, any element of system 100 configured to communicate location-estimation information with a mobile device, e.g., device 102.

For example, LOBTs 104, 106 and/or 108 may include one or more cellular source transmitters, e.g., cellular base stations, cellular operators, cellular antennas and the like, one or more digital radio stations, one or more BT devices, one or more WiFi hotspots or AP's, one or more NFC devices, and the like.

The phrase "location-estimation information" (also referred to as "location information") as used herein may include any information, which may be communicated between a LOBT and a mobile device, and may be configured for estimating one or more parameters, e.g., a position fix (FIX), position-velocity-time (PVT), and the like, representing a position of the mobile device, for example, a location of the mobile device, e.g., a relative location of the mobile device with respect to the LOBT and/or an absolute location of the mobile device, a movement of the mobile device, and/or any other position-related attribute of the mobile device.

The location-estimation information may include information received by the mobile device and/or information transmitted by the mobile device. The location-estimation information may include, for example, identifier information identifying the LOBT; timing information corresponding to a timing of one or more wireless communication signals communicated between the LOBT and the mobile device, e.g., a Time of Departure (ToD), a Time of Arrival (ToA), and the like; correction information, for example, clock bias information relating to a clock bias of the LOBT, and the like; location information representing a location of the LOBT, and the like.

In one example, a mobile device, e.g., device 102, may communicate with a WiFi LOBT, e.g., an AP, wireless communication signals including location-estimation information configured to estimate a distance between the mobile device and the WiFi LOBT based on a Time of Flight (ToF) measurement. According to this example, the location-estimation information may include, for example, an identifier to identify the WiFi AP, one or more ToD values corresponding to a ToD of the wireless communication signals and/or one or more ToA values corresponding to a ToA of the wireless communication signals.

In another example, a mobile device, e.g., device 102, may communicate with a WiFi LOBT, e.g., an AP, wireless communication signals including location-estimation information configured to estimate a distance between the mobile device and the WiFi LOBT based on a Received Signal Strength Indication (RSSI) measurement. According to this example, the location-estimation information may include, for example, an identifier to identify the WiFi AP, an absolute location of the WiFi AP, and the like.

In some demonstrative embodiments, the location-estimation information communicated between device 102 and an LOBT of LOBTs 104, 106 and 108 may include any information, which may be indicative of a relative location and/or position, e.g., a distance and/or velocity, between device 102 and the LOBT and/or any information, which may be used a part of a location measurement for estimating the relative location, e.g., the distance, between device 102 and the LOBT.

For example, the location-estimation information may include one or more timing parameters representing timing information corresponding to one or more wireless communication signals communicated between transceivers 130, 131 and/or 132 and LOBTs 104, 106 and/or 108; one or more distance parameters representing distance information corresponding to measured distances between device 102 and LOBTs 104, 106 and/or 108; one or more absolute location parameters representing an absolute location of LOBTs 104, 106 and/or 108; and/or any other information.

In some demonstrative embodiments, transceivers 130, 131 and/or 132 may determine location-related measurements corresponding to a location of device 102 based on the location information received from LOBTs 104, 106 and/or 108. For example, transceivers 130, 131 and/or 132 may determine one or more ToF measurements with respect to wireless communication signals communicated between transceivers 130, 131 and/or 132 and LOBTs 104, 106 and/or 108.

In some demonstrative embodiments, system 100 may include at least one location calculator (also refereed to as "Location Calculation Entity (LCE)") 134 configured to estimate the location of device 102 based on the location measurements between device 102 and LOBTs 104, 106 and/or 108.

In some demonstrative embodiments, LCE 134 may be implemented as part of device 102, e.g., as shown in FIG. 1.

In other embodiments, the functionality of LCE 134 may be implemented by another element of system 100. In one example, the functionality of LCE 134 may be implanted as part of a server 122, for example, a Location Simultaneous Connectivity Server (LSCS), e.g., as described below. According to this example, device 102 may communicate to server 122 the location measurements with respect to the LOBTs, and the server may determine the location of device 102, e.g., as described below.

In other embodiments, the functionality of LCE 134 may be distributed between device 102 and one or more other elements of system 100, e.g., server 122. For example, device 102 may implement one or more functionalities of LCE 134, e.g., to determine the ToF measurements and/or the distances between device 102 and LOBTs 104, 106 and/or 108, and to transmit device—specific measurement information corresponding to device 102, e.g., including the ToF measurements and/or the determined distances with respect to LOBTs 104, 106 and/or 108. Server 122 may have LOBT information relating to LOBTs 104, 106 and 108, e.g., information relating to absolute locations of LOBTs 104, 106 and/or 108. Server 122 may determine the location of device 102 based on the device-specific measurement information received from device 102 and the LOBT information of LOBTs 104, 106 and/or 108.

In some demonstrative embodiment, server 122 may include at least one transceiver 138 to communicate via at east one antenna 113 with device 102 and/or LOBTs 104, 106 and/or 108, e.g., as described below.

In some demonstrative embodiments, system 100 may include at least one location-based module to process and/or utilize the estimated location of device 102.

In some demonstrative embodiments, the location-based module may include at least one application 136 implemented by device 102. In other demonstrative embodiments, application 136 may be implemented as part of another element of system 100, e.g., as part of server 122 or any other server or device.

In some demonstrative embodiments, application 136 may include, for example, an application of location-based device persona, an application of Contextual Aware Computing, one or more Location Enabled Services (LES) applications, and the like.

In one example, application 136 may include a road/terrain navigation application, which may use the location information in order to navigate a vehicle on a road/terrain.

In another example, application 136 may include a consumer application, a social application, an entertainment application, a sports application, e.g., a running application, a bicycle tour application, and the like, a location based recommendation application, e.g., a restaurant recommendation application, a touristic location recommendation application, an entertainment recommendation application and the like, a tracking application, e.g., a fleet management application, a delivery management application, a transportation management application, and the like.

In some demonstrative embodiments, the location-based module may include at least one element external to device 102, e.g., an end-point (EP) device 120, configured to utilize and/or process the estimated location of device 102. In one example, EP 120 may include an emergency service configured to perform one or more emergency operations with respect to a user of device 102, e.g., based on the estimated location of device 102. In another example, EP device 120 may include a server to provide a location-based service to a user of device 102, e.g., a social service, a consumer service, and the like.

In some demonstrative embodiments, at least one transceiver of transceivers 130, 131 and 132, e.g., transceiver 131, may simultaneously maintain a plurality of location-based connections with a plurality of LOBTs, e.g., two or more of LOBTs 104, 106 and 108.

The phrase "location-based connection" as used herein may refer to a connection between a mobile device, e.g., device 102, and a LOBT, e.g., LOBT 104, 106 and/or 108, which enable the mobile device to communicate location-estimation information with the LOBT.

In some demonstrative embodiments, at least one transceiver of transceivers 130, 131 and 132, e.g., transceiver 131, may simultaneously maintain a plurality of simultaneous Media-Access-Control (MAC) layer connections with a plurality LOBTs, e.g., two or more of LOBTs 104, 106 and 108, and may communicate location-estimation information with the plurality of LOBTs via the plurality of simultaneous MAC-layer connections, e.g., as described in detail below.

The phrase "MAC-layer connection" as used herein may refer to a connection between MAC layers of first and second communication entities, in a manner, which enables communication, e.g., unidirectional or bidirectional communication, between the MAC layers of first and second communication entities.

In some demonstrative embodiments, transceiver 131 may be configured to establish a first location-based connection, e.g., in the form of a first MAC-layer connection, with a first LOBT, e.g., LOBT 104, and to establish a second location-based connection, e.g., in the form of a second MAC-layer connection, with a second LOBT, e.g., LOBT 106, while the first location-based connection with the first LOBT is still active.

In some demonstrative embodiments, transceiver 131 may directly establish the first MAC-layer connection with LOBT 104 by transmitting a first connectivity request to LOBT 104, and receiving a first connectivity request acknowledgement from LOBT 104, in response to the first connectivity request. Transceiver 131 may directly establish the second MAC-layer connection with LOBT 106 by transmitting a second connectivity request to LOBT 106, after receiving the first connectivity request acknowledgement from LOBT 104, and while the connection with LOBT 104 is still active, and receiving a second connectivity request acknowledgement from LOBT 106, in response to the second connectivity request.

In some demonstrative embodiments, server 122 may establish the simultaneous location-based connections between transceiver 131 and LOBTs 104 and 106. For example, server 122 may receive a simultaneous-connectivity request for connecting between device 102 and LOBTs 104 and 106. In one example, server 122 may receive the simultaneous-connectivity request from transceiver 131. In another example, server 122 may receive the simultaneous-connectivity request from EP 120, application 136 or LCE 134. The simultaneous-connectivity request may include, for example, an indication of the plurality of LOBTs to be simultaneously connected to transceiver 131.

In some demonstrative embodiments, server 122 may establish the first MAC-layer connection between transceiver 131 and LOBT 104 by transmitting a first connectivity request to LOBT 104, and receiving a first connectivity request acknowledgement from LOBT 104, in response to the first connectivity request.

In some demonstrative embodiments, server 122 may establish the second MAC-layer connection between transceiver 131 and LOBT 106 by transmitting a second connectivity request to LOBT 106, after receiving the first connectivity request acknowledgement from LOBT 104, and while the connection with LOBT 104 is still active, and receiving a second connectivity request acknowledgement from LOBT 106, in response to the second connectivity request.

In some demonstrative embodiments, server 122 may transmit to transceiver 131 a message, e.g., an acknowledgement message, acknowledging to transceiver 131 that the simultaneous MAC-layer connections between transceiver 131 and LOBTs 104 and 106 have been successfully established.

In some demonstrative embodiments, transceiver 131 may communicate location-estimation information with LOBTs 104 and 106, e.g., while both connections with LOBTs 104 and 106 are active.

In some demonstrative embodiments, transceiver 131 may be configured to embed detection and/or processing mechanisms of wireless medium signals communicated with the plurality of LOBTs simultaneously-connected to transceiver 131. For example, transceiver 131 may be configured to detect, decode and/or analyze information communicated with the plurality of LOBTs, including relevant location information communicated with the LOBTs, e.g., raw signal, processed signal, signal key-performance-indicators (KPIs), signal Packet data units PDUs, signal packets, and the like.

In some demonstrative embodiments, transceiver 131 may provide to LCE 134 simultaneous-connectivity information corresponding to the simultaneous location-based connections between transceiver 131 and the plurality of LOBTs, and LCE 134 may determine a position of device 102 based on the simultaneous-connectivity information, e.g., as described below.

In some demonstrative embodiments, transceiver 131 may measure one or more location-estimation parameters, e.g., ToF parameters, based on the location-estimation information communicated between transceiver 131 and LOBTs 104 and 106, e.g., while both connections with LOBTs 104 and 106 are active.

In some demonstrative embodiments, transceiver 131 may provide to LCE 134 the location-estimation parameters, e.g., corresponding to both LOBTs 104 and 106. LCE 134 may use the location-estimation parameters, e.g., corresponding to both LOBTs 104 and 106, to estimate the position and/or location of device 102.

In one example, transceiver 131 may communicate location-related information with LOBT 104 as part of a first ToF measurement between device 102 and LOBT 104; and may communicate location-related information with LOBT 106 as part of a second ToF measurement between device 102 and LOBT 106.

In one example, transceiver 131 may perform the first ToF measurement with LOBT 104, for example, by transmitting a message, denoted M1, to LOBT 104, at a time, denoted t1, e.g., in an unassociated manner. The time t1 may be a Time of Departure (ToD), denoted ToD(M1), of the message M1. LOBT 104 may receive the message M1 and determine a time, denoted t2, e.g., by determining a Time of Arrival (ToA), denoted ToA(M1), of the message M1. LOBT 104 may transmit an acknowledge message, denoted M1-ACK, to transceiver 131, at a time, denoted t3. The message M1-ACK may include, for example, an acknowledgement message transmitted in response to the message M1. The time t3 may be a ToD, denoted ToD(M1-ACK), of the message M1-ACK. Transceiver 131 may receive the message M1-ACK and determine a time, denoted t4, e.g., by determining a ToA, denoted ToA(M1-ACK), of the message M1-ACK. LOBT 104 may transmit a message, denoted M2, to transceiver 131. Message M2 may include, for example, information corresponding to the time t2 and/or the time t3. For example, message M2 may include a timestamp, e.g., a ToA timestamp, including the time t2, and a timestamp, e.g., a ToD timestamp, including the time t3. Transceiver 131 may transmit to LOBT 104 an acknowledge message, denoted M2-ACK, including an acknowledgement message transmitted in response to the message M2.

In some demonstrative embodiments, transceiver 131 may communicate a similar sequence of messages with LOBT 106 to perform the second ToF measurement.

In some demonstrative embodiments, transceiver 131 may simultaneously maintain the connections to LOBTs 104 and 106, and perform one or more communications of the first ToF measurement during a time period, which at least partially overlaps, a time period for performing one or more communications of the second ToF measurement.

For example, transceiver 131 may be simultaneously connected to both LOBT 104 and LOBT 106, and may communicate the messages M1, M1-ACK, M2 and/or M2-ACK with LOBT 104 during a first time period, while transceiver 131 is connected to LOBT 106 and/or communicate messages M1, M1-ACK, M2 and/or M2-ACK with LOBT 106, during a second time period, which at least partially overlaps the first time period, while transceiver 131 is connected to LOBT 104.

For example, transceiver 131 may communicate the messages M1, M1-ACK, M2 and/or M2-ACK with LOBT 106 between one or more of the messages M1, M1-ACK, M2 and/or M2-ACK communicated with LOBT 104; and/or transceiver 131 may communicate the messages M1, M1-ACK, M2 and/or M2-ACK with LOBT 104 between one or more of the messages M1, M1-ACK, M2 and/or M2-ACK communicated with LOBT 106.

In some demonstrative embodiments, transceiver 131 may determine a first set of the time values t1, t2, t3 and t4 corresponding to the first ToF measurement with LOBT 104 and a second set of the time values t1, t2, t3 and t4 corresponding to the second ToF measurement with LOBT 106.

In some demonstrative embodiments, transceiver 131 may provide to LCE 134 both the first and second sets of the time values t1, t2, t3 and t4 corresponding to the first and second ToF measurements.

In some demonstrative embodiments, LCE 134 may determine a first ToF between device 102 and LOBT 104, for example, based on the first set of the time values t1, t2, t3 and t4; and a second ToF between device 102 and LOBT 106, for example, based on the second set of the time values t1, t2, t3 and t4.

For example, LCE 134 may determine the first and second ToFs based on a calculation applied to the time values t1, t2, t3 and t4. For example, the first and/or second ToFs may be determined, e.g., as follows:

$$\text{ToF}=[(t4-t1)-(t3-t2)]/2 \quad (1)$$

In some demonstrative embodiments, LCE 134 may determine a first range between device 102 and LOBT 104 based on the first determined ToF between device 102 and LOBT 104, and/or a second range between device 102 and LOBT 106 based on the second determined ToF between device 102 and LOBT 106.

For example, LCE 134 may determine the range, denoted $r_k$, e.g., as follows:

$$r_k=\text{ToF}*C \quad (2)$$

wherein C denotes the radio wave propagation speed, e.g., the speed of light.

In some demonstrative embodiments, LCE 134 may determine a location of device 102, e.g., an absolute location of device 102, based on the estimated ranges $r_k$ corresponding to LOBTs 104 and 106, e.g., by applying a trilateration calculation to the first and second ranges and one or more additional ranges corresponding to one or more other LOBTs, e.g., LOBT 108.

In some demonstrative embodiments, transceivers 130, 131 and/or 132 and/or LOBTs 104, 106 and/or 106 may communicate with one another according to a connectivity communication scheme enabling simultaneous connectivity between a transceiver and a plurality of LOBTs.

In some demonstrative embodiments, the simultaneous connectivity scheme may utilize one or more existing connectivity messages and/or protocols, e.g., according to WGA Specifications, IEEE 802.11 Specifications, LTE Specifications, and the like.

In some demonstrative embodiments, the simultaneous connectivity scheme may utilize one or more dedicated messages for defining, establishing and/or maintaining the simultaneous connectivity between the transceiver and a plurality of LOBTs.

The dedicated messages may include, one or more notification messages, which may be communicated between the transceiver and the plurality of LOBTs; and/or one or more request messages, e.g., including a request of the transceiver to simultaneously connect to the plurality of LOBTs, a request of the transceiver to subscribe to one or more services provided by the LOBTs, and the like, e.g., as described below with reference to FIGS. 3, 4 and/or 5.

In some demonstrative embodiments, device 102 may include a controller 135 to control transceivers 130, 131 and/or 132, e.g., as described in detail below.

In some demonstrative embodiments, controller 135 may be implemented as part of LCE 134 and/or LCE 134 may perform the functionality of controller 135, e.g., as shown in FIG. 1. In other embodiments, controller 135 may be implemented as a separate element of device 102 and/or as part of any other element of device 102.

In some demonstrative embodiments, controller 135 may control transceivers 130, 131 and/or 132 to simultaneously connect to two or more of LOBTs 104, 106 and/or 108.

In some demonstrative embodiments, LCE 134 may control transceivers 130, 131 and/or 132 to connect with LOBTs 104, 106 and/or 108 based on one or more KPIs relating to the estimation of the position of device 102. For example, the KPIs may include a particular number of LOBTs to be connected, e.g., one LOBT, two or more LOBTs; a particular type of LOBTs to be connected, e.g., a cellular LOBT, a WiFi LOBT, and the like; one or more particular LOBTs to be connected; one or more particular attributes of the LOBTs to be connected, e.g., an accuracy of location information provided by the LOBT, a power consumption for communicating with the LOBT, an availability of the LOBT, and the like; one or more attributes of a connection between the transceiver and the one or more LOBTs, e.g., a connectivity type, e.g., half or full duplex, a connectivity wireless medium signal quality, a security level, a communication frequency band, and the like.

In some demonstrative embodiments, the KPIs may be defined by application 132 and/or EP 120.

For example, a first application 136 may have a first intended use for the requested location information, e.g., vehicle navigation, which may require relatively recent and up-to-date location information, e.g., compared to a second application 136, which may have a second intended use for the requested location information, e.g., a social application, which may require less-frequent updating of the location information.

In another example, applications 136 may be characterized according to a type of service provided by applications 136 and/or LOBTs 104, 106 and 108 may be characterized according to a location estimation technology utilized by LOBTs 104, 106 and 108.

For example, an accuracy criterion corresponding to applications 136 may be predefined, e.g., as follows:

TABLE 1

| Service | Required Accuracy |
| --- | --- |
| Outdoors & Indoor smart navigation | 1-5 m |
| Always located | 5-10 m |
| Location based scheduling | 5-10 m |
| Location scoreboarding & logging | 5-10 m |
| Location & activity based profiling | 5-10 m |
| Smart shopping | 1-5 m |
| Location sharing | 3-5 m |
| Anti Theft | 5-10 m |
| Assets & people tracking | 3-20 m |
| Location aware computing | 3-10 m |
| Location enabled ERM | 3-10 m |
| Location authentication | 3-10 m |

For example, an accuracy criterion corresponding to LOBTs 104, 106 and 108 may be predefined, e.g., as follows:

TABLE 2

| Technology | Required Accuracy |
| --- | --- |
| GNSS | 4-10 m |
| WIFI | 20-25 m |
| Cellular | 50-250 m |

In some demonstrative embodiments, controller 135 may control a first set of transceivers 130, 131 and/or 132 to connect to a first set of LOBTs 104, 106 and/or 108, e.g., to estimate the location of device 102 for the first application 136. LCE 134 may control a second set of transceivers 130, 131 and/or 132 to connect to a second set of LOBTs 104, 106 and/or 108, e.g., to estimate the location of device 102 for the second application 136.

In some demonstrative embodiments, LCE 134 and/or transceivers 130, 131 and/or 132 may be configured to enable controller 135 to define a particular set of LOBTs to be connected simultaneously for a particular transceiver, e.g., transceiver 131.

In some demonstrative embodiments, controller 135 may control transceiver 131 to simultaneously connect to two or more LOBTs over a plurality different wireless communication frequencies.

In some demonstrative embodiments, controller 135 may control transceiver 131 to simultaneously connect to two or more LOBTs of a common LOBT type, e.g., a plurality of APs, a plurality of cellular base stations, and the like.

In some demonstrative embodiments, controller 135 may control transceiver 131 to simultaneously connect to two or more LOBTs of two or more different LOBT types, e.g., two or more of an AP, a cellular base station, a Bluetooth device, and the like.

In some demonstrative embodiments, controller 135 may control transceiver 131 to simultaneously connect to two or more LOBTs over a unidirectional connection and/or a bidirectional connection.

In one example, transceiver 131 may include a WiFi transceiver, and controller 135 may provide transceiver 131 with information defining a set of WiFi APs, e.g., including LOBTs 104, 106 and/or 108, to be simultaneously connected. The information defining the set of APs may include, for example, MAC addresses of the set of APs, communication frequency bands for communicating with the set of APs, security settings for communicating with the set of APs, and the like.

In some demonstrative embodiments, controller 135 may define one or more attributes for simultaneous connection of transceiver to two or more of LOBTs 104, 106 and 108. The attributes may include, for example, connectivity types, e.g., half duplex or full duplex, operation modes, parameters to be utilized by transceiver 131 for the simultaneous connection, and/or one or more KPIs to be maintained by receiver 131 during the simultaneous connection, e.g., as described above.

In some demonstrative embodiments, controller 135 may negotiate one or more of the attributes with transceivers 130, 131 and/or 132.

For example, controller 135 may send a request to transceiver 131 including one or more requested attributes, and transceiver may send a response to controller 135. The response may include, for example, an acknowledgment to acknowledge the requested attributes. Additionally or alternatively, the response may include one or more offered attributes, which are offered by transceiver 131.

In some demonstrative embodiments, LCE 134 may interact with two or more of transceivers 130, 131 and 132, e.g., in parallel, to generate a combined and/or hybrid location calculation, based on communications and/or measurements performed by the two or more transceivers, e.g., in parallel.

In some demonstrative embodiments, transceivers 130, 131 and/or 132 may simultaneously connect to two or more of LOBTs 104, 10 and/or 108, for example, by directly communicating with the LOBTs, e.g., as described above.

In some demonstrative embodiments, server 122 may perform the functionality of a LSCS to mediate and/or coordinate between transceivers 130, 131 and/or 132 and LOBTs 104, 106 and/or 108.

In some demonstrative embodiments, transceivers 130, 131 and/or 132, controller 135, and/or LCE 134 may interact with server 122, which in turn may communicate with LOBTs 104, 106 and/or 108, e.g., via mediums 103 and/or any other wired or wireless mediums.

In some demonstrative embodiments, transceiver 131 may transmit to server 122 a simultaneous connectivity request identifying a plurality of LOBTs, to which transceiver 131 requests to connect. Server 122 may communicate with the plurality of LOBTs to establish the simultaneous connection between transceiver 131 and the plurality of LOBTs. Transceiver 131 may receive from server 122 a connectivity request acknowledgement to acknowledge establishment of the plurality simultaneous connections between transceiver 131 and the plurality of LOBTs. Transceiver 131 may communicate with the plurality of LOBTs via the plurality of simultaneous connections.

In some demonstrative embodiments, server 122 may optionally perform at least part of the functionality of LCE 134. For example, server 122 may perform the functionality of a local LCE 134 to control transceivers of a plurality of devices, e.g., including device 102, and/or to calculate the position of the plurality of devices based on measurements performed by the transceivers of the devices.

In some demonstrative embodiments, device 102 may also include, for example, one or more of a processor 191, an input unit 192 an output unit 193, a memory unit 194, and a storage unit 195. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 102, of one or more of applications 136, and/or of one or more suitable applications.

Input unit 192 includes, for example, a keyboard, a keypad, a mouse, a touch-pad, a track-ball, a stylus, a microphone, or other suitable pointing device or input device. Output unit 193 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication device 102. For example, memory 194 and/or storage unit 195 may store instructions resulting in one or more of applications 136.

Figure 2:
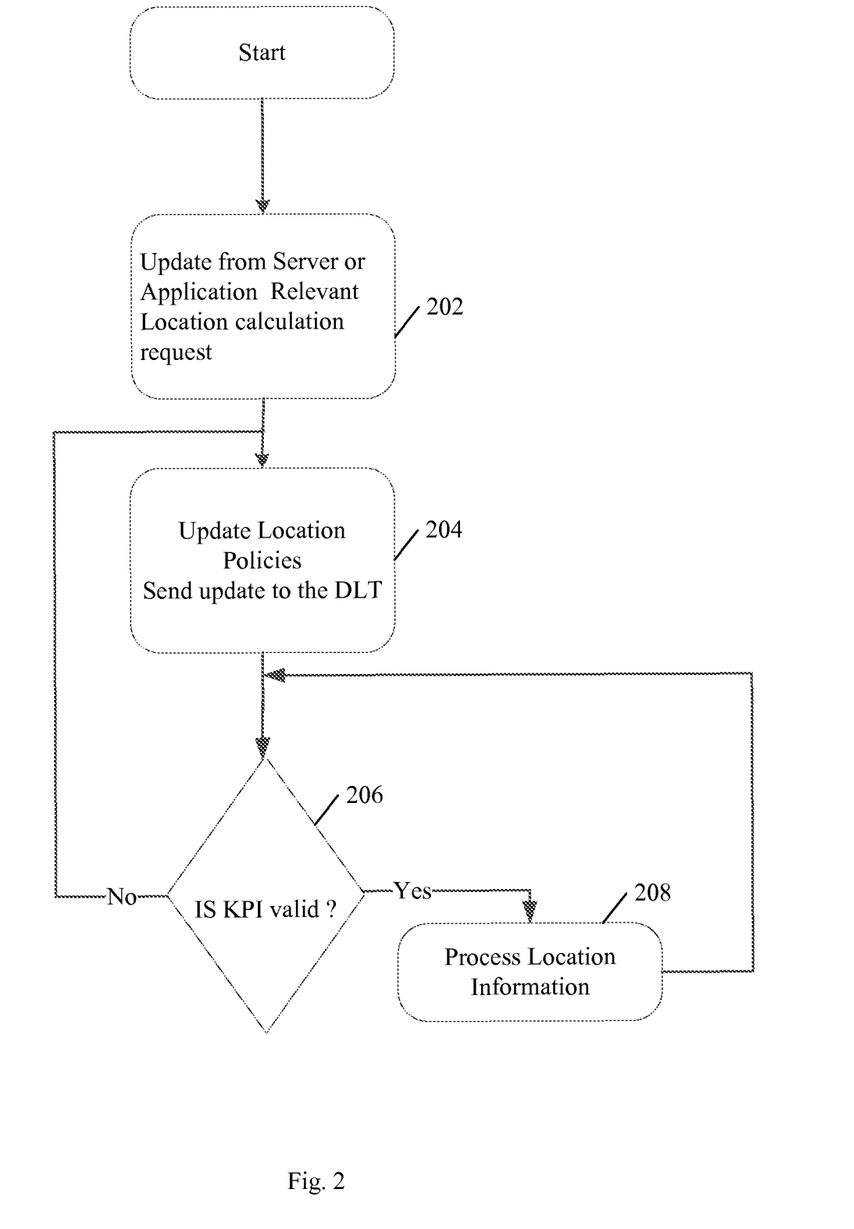
FIG. 2 is a schematic flow chart illustration of a method of controlling a location transceiver, in accordance with some demonstrative embodiments.

Reference is made to FIG. 2, which schematically illustrates a method of controlling a location transceiver, in accordance with some demonstrative embodiments. In some demonstrative embodiments, one or more of the operations of the method of FIG. 2 may be performed by a controller, e.g., controller 135 (FIG. 1), to control a transceiver, e.g., transceiver 131 (FIG. 1).

As indicated at block 202, the method may include receiving a location position request corresponding to a location of a mobile device, e.g., device 102 (FIG. 1). For example, LCE 134 (FIG. 1) may receive a location position request from a location-based module, for example, an application and/or an EP, e.g., application 136 (FIG. 1) ad/or EP 120 (FIG. 1).

The location position request may define one or more KPIs relating to the estimation of the position of the mobile device, for example, a time period for providing the estimated position, an accuracy of the estimation, a power envelope corresponding to the estimation and/or the like, e.g., as described above.

As indicated at block 204, the method may include defining a location policy for controlling one or more DLTs to communicate location information with one or more LOBTs. For example, LCE 134 (FIG. 1) may define a location policy for controlling transceivers 130 (FIG. 1), 131 (FIG. 1) and/or 132 (FIG. 1) to communicate location information with one or more of LOBTs 104 (FIG. 1), 106 (FIG. 1) and/or 108 (FIG. 1), e.g., as described above.

As indicated at block 206, the method may include determining whether or not the one or more KPIs are satisfied by the location information communicated by the DLTs. For example, LCE 134 (FIG. 1) may determine whether or not the location information communicated by transceivers 130 (FIG. 1), 131 (FIG. 1) and/or 132 (FIG. 1) meets the requirements of the KPIs defined by the location position request, e.g., as described above.

As indicated at block 208, the method may include, for example, processing the location information, e.g., if the one or more KPIs are satisfied by the location information communicated by the DLTs. For example, LCE 134 (FIG. 1) may process the location information to estimate the location of device 102 (FIG. 1), e.g., as described above.

The method may include, for example, repeating the defining the location policy for controlling one or more DLTs, e.g., as indicated at block 204, for example, if the one or more KPIs are not satisfied by the location information communicated by the DLTs.

Figure 3:
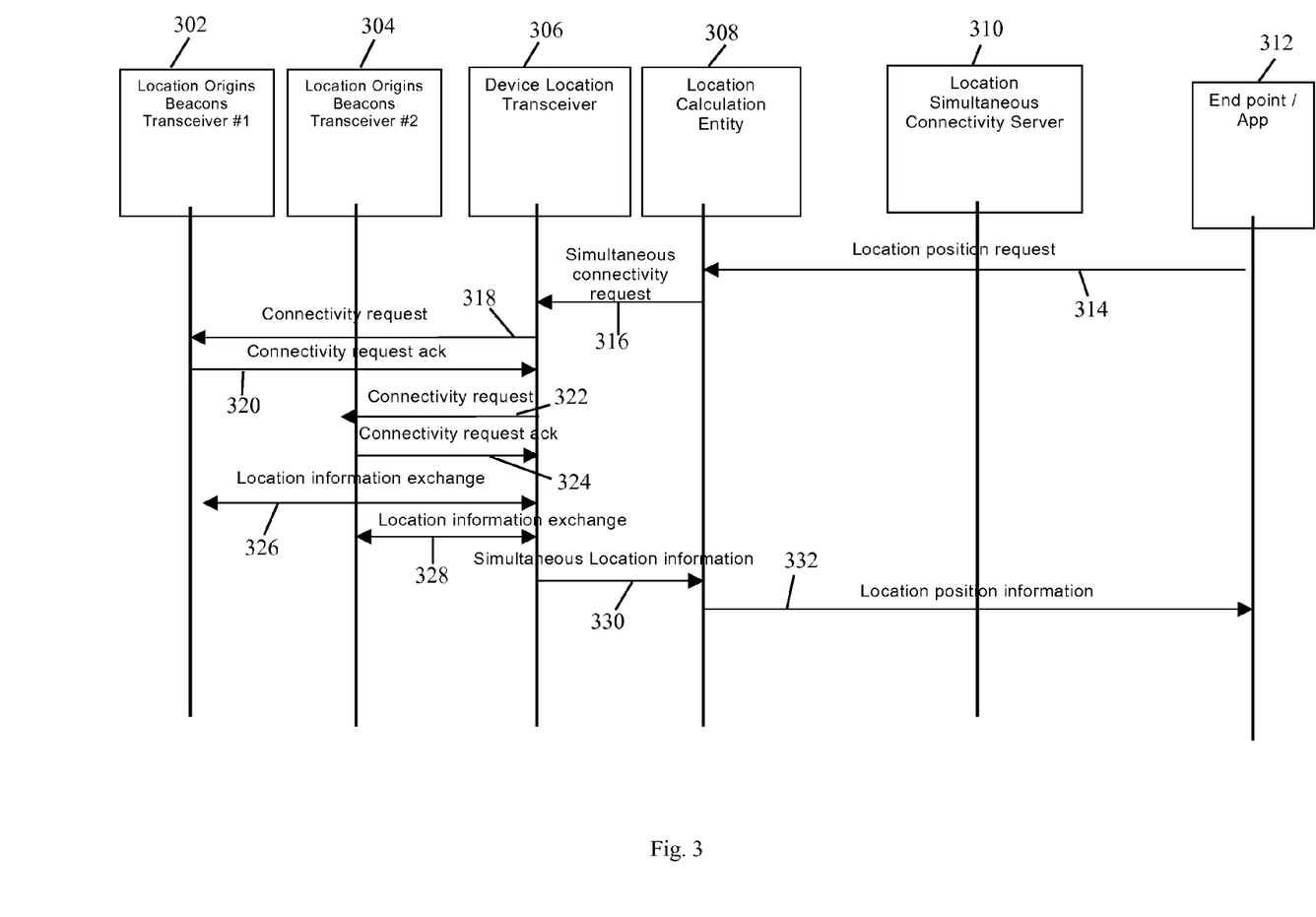
FIG. 3 is a schematic illustration of a sequence of operations performed by elements of a wireless communication system, in accordance with some demonstrative embodiments.

FIG. 3 illustrates a sequence of operations performed by elements of a wireless communication system for location estimation, in accordance with some demonstrative embodiments.

In some demonstrative embodiments, a location-based module 312, e.g., an application and/or an EP, may transmit a location position request 314 to an LCE 308. For example, location-based module 312 may perform the functionality of application 136 (FIG. 1) or EP 120 (FIG. 1), and/or LCE 308 may perform the functionality of LCE 134 (FIG. 1).

In some demonstrative embodiments, LCE 308 may send a simultaneous connectivity request 316 to a transceiver 306. For example, transceiver 306 may perform the functionality of transceiver 131 (FIG. 1). Simultaneous connectivity request 316 may define at least a first LOBT 302 and a second LOBT 304, to which transceiver 306 may be requested to connect. Simultaneous connectivity request 316 may be defined, for example, based on the contents of location position request 314, e.g., as described above.

In some demonstrative embodiments, transceiver 306 may establish a simultaneous connection to both LOBTs 302 and 304.

In some demonstrative embodiments, transceiver 306 may transmit a connectivity request 318 to LOBT 302, and may receive a connectivity acknowledgement 320 from LOBT 302, to establish a first connection with LOBT 302.

In some demonstrative embodiments, transceiver 306 may transmit a connectivity request 322 to LOBT 304, e.g., while transceiver 306 is still connected to LOBT 303. Transceiver 306 may receive a connectivity acknowledgement 324 from LOBT 304, to establish a second connection with LOBT 304, e.g., while the first connection with LOBT 302 is still active.

In some demonstrative embodiments, transceiver 306 may communicate location information 326 with LOBT 302, and may communicate location information 328 with LOBT 304, e.g., as described above.

In some demonstrative embodiments, transceiver 306 may provide simultaneous location information 330 to LCE 308. Simultaneous location information 330 may be determined, for example, based on measurements, e.g., ToF measurements, performed by transceiver 306 with respect to the first and second simultaneous connections, e.g., as described above.

In some demonstrative embodiments, LCE 308 may communicate location position information 332 to location-based module 302. For example, LCE 308 may determine location position information 332 based on simultaneous location information 330, e.g., as described above.

Figure 4:
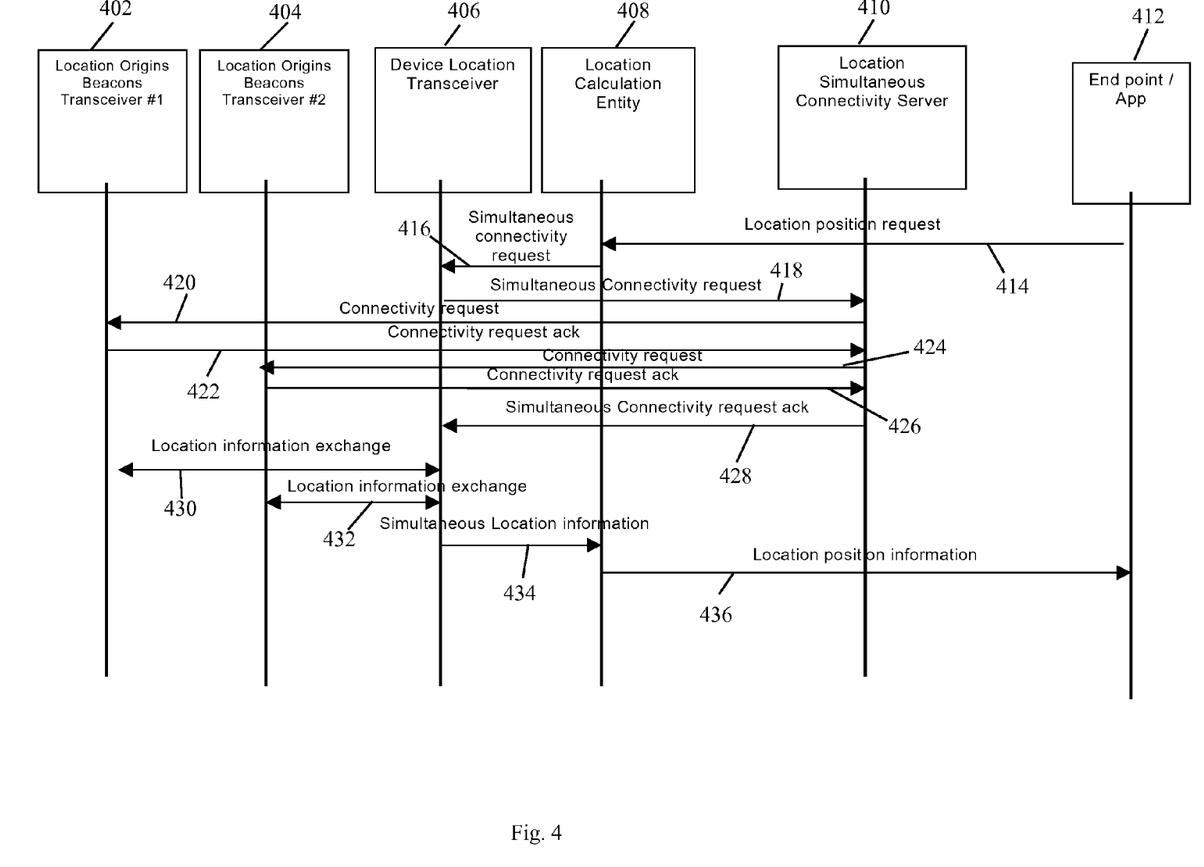
FIG. 4 is a schematic illustration of another sequence of operations performed by elements of a wireless communication system, in accordance with some demonstrative embodiments.
Figure 5:
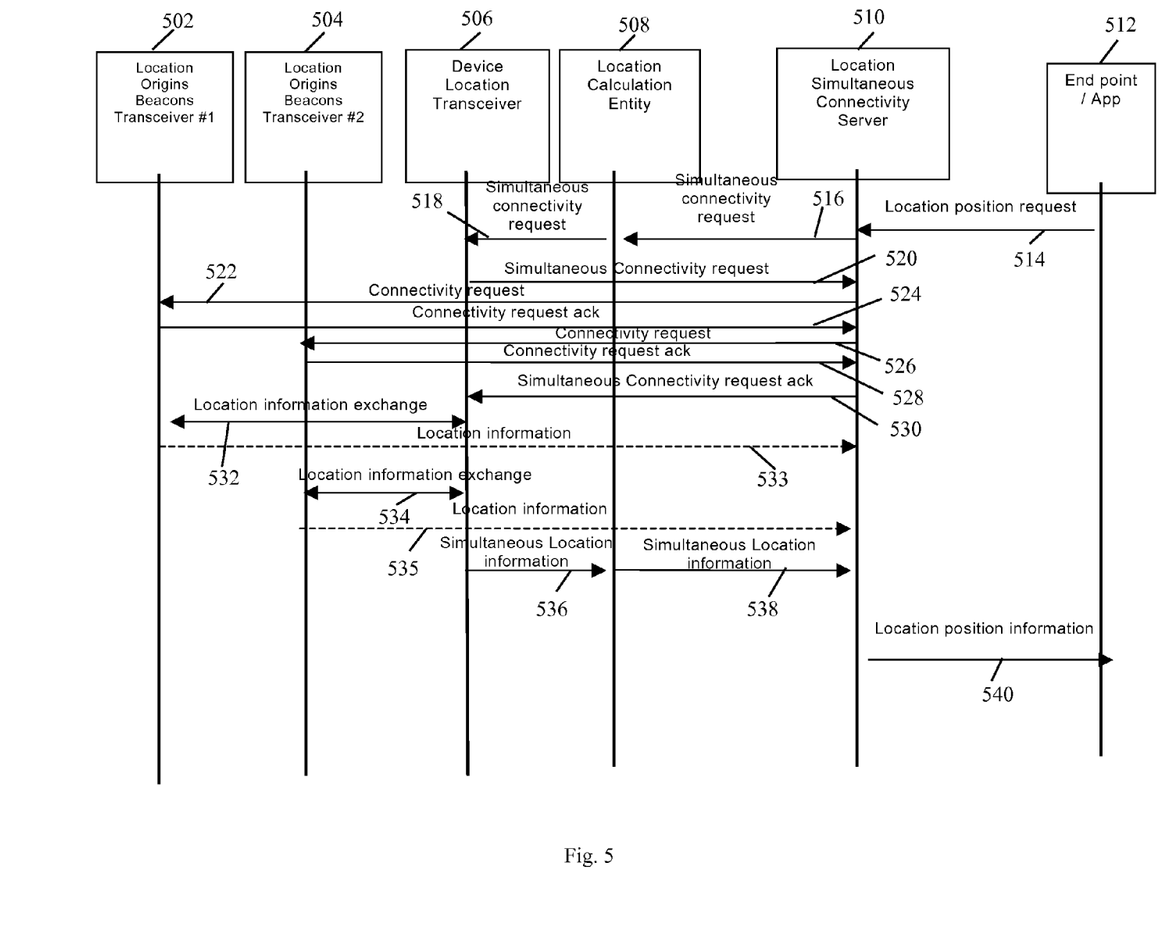
FIG. 5 is a schematic illustration of another sequence of operations performed by elements of a wireless communication system, in accordance with some demonstrative embodiments.

FIG. 4 illustrates another sequence of operations performed by elements of a wireless communication system for location estimation, in accordance with some demonstrative embodiments.

In some demonstrative embodiments, a location-based module 412, e.g., an application and/or an EP, may transmit a location position request 414 to an LCE 408. For example, location-based module 412 may perform the functionality of application 136 (FIG. 1) or EP 120 (FIG. 1), and/or LCE 408 may perform the functionality of LCE 134 (FIG. 1).

In some demonstrative embodiments, LCE 408 may send a simultaneous connectivity request 416 to a transceiver 406. For example, transceiver 406 may perform the functionality of transceiver 131 (FIG. 1). Simultaneous connectivity request 416 may define at least a first LOBT 402 and a second LOBT 404, to which transceiver 406 may be requested to connect. Simultaneous connectivity request 416 may be defined, for example, based on the contents of location position request 414, e.g., as described above.

In some demonstrative embodiments, transceiver 406 may send a simultaneous connectivity request 418 to a LSCS 410, requesting LSCS 410 to establish simultaneous connections between transceiver 406 and LOBTs 402 and 404. For example, LSCS 410 may perform the functionality of server 122 (FIG. 1).

In some demonstrative embodiments, LSCS 410 may transmit a connectivity request 420 to LOBT 402 requesting to establish a first connection between LOBT 402 and transceiver 406. LSCS 410 may receive a connectivity acknowledgement 422 from LOBT 402, acknowledging the establishment of the first connection between LOBT 402 and transceiver 406.

In some demonstrative embodiments, LSCS 410 may transmit a connectivity request 424 to LOBT 404 requesting to establish a second connection between LOBT 404 and transceiver 406. LSCS 410 may receive a connectivity acknowledgement 426 from LOBT 404, acknowledging the establishment of the second connection between LOBT 404 and transceiver 406, e.g., while the first connection between LOBT 402 and transceiver 406 is still active.

In some demonstrative embodiments, LSCS 410 may transmit a simultaneous connectivity request acknowledgement 428 to transceiver 406 to acknowledge that transceiver 406 is simultaneously connected to both LOBTs 402 and 404.

In some demonstrative embodiments, transceiver 406 may communicate location information 430 with LOBT 402, and may communicate location information 432 with LOBT 404.

In some demonstrative embodiments, transceiver 406 may provide simultaneous location information 434 to LCE 408. Simultaneous location information 434 may be determined, for example, based on measurements, e.g., ToF measurements, performed by transceiver 406 with respect to the first and second simultaneous connections, e.g., as described above.

In some demonstrative embodiments, LCE 408 may communicate location position information 436 back to location-based module 402. For example, LCE 408 may determine location position information 436 based on simultaneous location information 434, e.g., as described above.

FIG. 5 illustrates another sequence of operations performed by elements of a wireless communication system for location estimation, in accordance with some demonstrative embodiments.

In some demonstrative embodiments, a location-based module 512, e.g., an application and/or an EP, may transmit a location position request 514 to an LSCS 510. For example, location-based module 512 may perform the functionality of application 136 (FIG. 1) or EP 120 (FIG. 1), and/or LSCS 510 may perform the functionality of server 122 (FIG. 1).

In some demonstrative embodiments, LSCS 510 may send a simultaneous connectivity request 516 to an LCE 508. Simultaneous connectivity request 516 may define at least a first LOBT 502 and a second LOBT 504, to which a transceiver 506 may be requested to connect. Simultaneous connectivity request 516 may be defined, for example, based on the contents of location position request 514, e.g., as described above. For example, LCE 508 may perform the functionality of LCE 134 (FIG. 1) and/or transceiver 506 may perform the functionality of transceiver 131 (FIG. 1).

In some demonstrative embodiments, LCE 508 may send a simultaneous connectivity request 518, which is based on request 516, to transceiver 506.

In some demonstrative embodiments, transceiver 506 may send a simultaneous connectivity request 520 to LSCS 110, requesting LSCS 510 to establish simultaneous connections between transceiver 506 and LOBTs 502 and 504.

In some demonstrative embodiments, LSCS 510 may transmit a connectivity request 522 to LOBT 502 requesting to establish a first connection between LOBT 502 and transceiver 506. LSCS 510 may receive a connectivity acknowledgement 524 from LOBT 502, acknowledging the establishment of the first connection between LOBT 502 and transceiver 506.

In some demonstrative embodiments, LSCS 510 may transmit a connectivity request 526 to LOBT 504 requesting to establish a second connection between LOBT 504 and transceiver 506. LSCS 510 may receive a connectivity acknowledgement 528 from LOBT 504, acknowledging the establishment of the second connection between LOBT 504 and transceiver 506, e.g., while the first connection between LOBT 502 and transceiver 506 is still active.

In some demonstrative embodiments, LSCS 510 may transmit a simultaneous connectivity request acknowledgement 530 to transceiver 506 to acknowledge that transceiver 506 is simultaneously connected to both LOBTs 502 and 504.

In some demonstrative embodiments, transceiver 506 may communicate location information 532 with LOBT 502, and may communicate location information 534 with LOBT 504.

In some demonstrative embodiments, LOBT 502 may communicate directly with LSCS 510 location information 533 based on communications between transceiver 506 and LOBT 502, and/or LOBT 504 may communicate directly with LSCS 510 location information 535 based on communications between transceiver 506 and LOBT 504.

In some demonstrative embodiments, transceiver 506 may provide simultaneous location information 536 to LCE 508. Simultaneous location information 536 may be determined, for example, based on measurements, e.g., ToF measurements, performed by transceiver 506 with respect to the first and second simultaneous connections, e.g., as described above.

In some demonstrative embodiments, LCE 508 may communicate simultaneous location information 538, which corresponds simultaneous location information 536, back to LSCS 410.

In some demonstrative embodiments, LSCS 510 may provide location position information 540 back to location-based module 412.

For example, LSCS 510 may include information relating to LOBTs 402 and/or 404, which may not be known to LCE 508. For example, LSCS 510 may include a database of LOBT locations including the absolute locations of LOBTs 502 and 504. LSCS 510 may receive simultaneous location information 538 from LCE 508, and may determine location position information 540 based on simultaneous location information 538 and the absolute locations of LOBTs 502 and 504, e.g., as described above.

Figure 6:
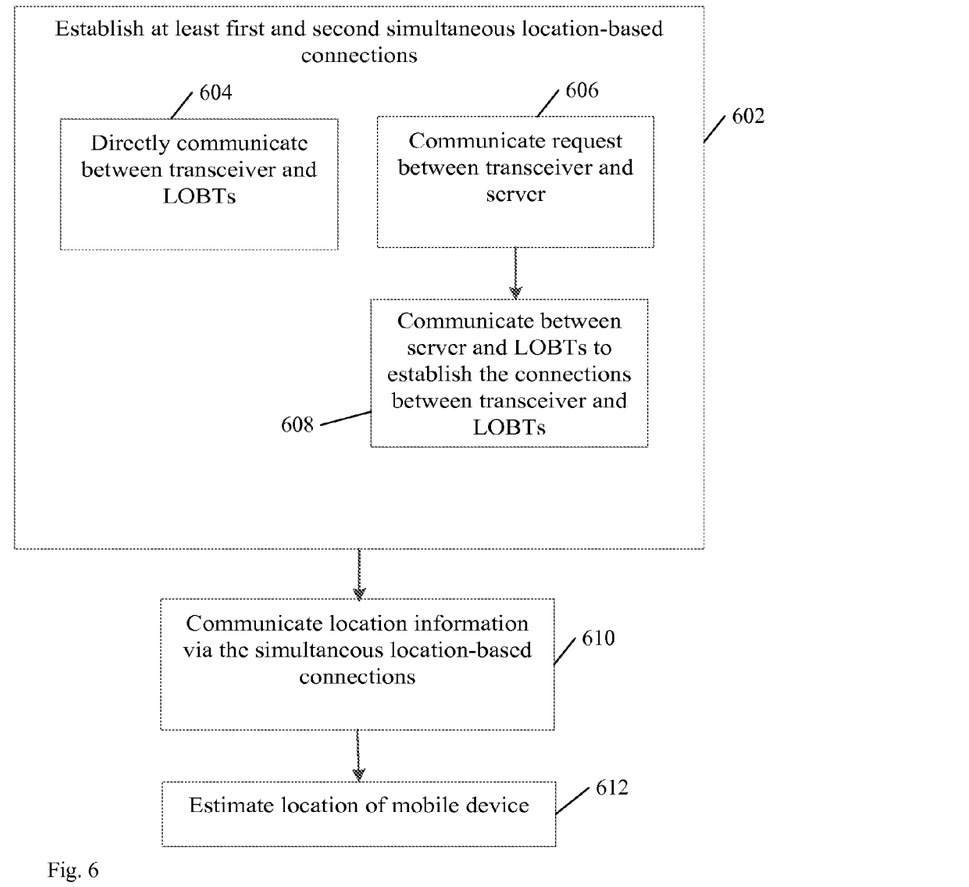
FIG. 6 is a schematic flow chart illustration of a method of simultaneously connecting to a plurality of location origin transceivers, in accordance with some demonstrative embodiments.

Reference is made to FIG. 6, which schematically illustrates a method of simultaneously connecting to a plurality of location origin transceivers, in accordance with some demonstrative embodiments. In some demonstrative embodiments, one or more operations of the method of FIG. 6 may be performed by one or more elements of system 100 (FIG. 1), e.g., device 102 (FIG. 1), transceiver 106 (FIG. 1), LCE 134 (FIG. 1), server 122 (FIG. 1) and/or LOBTs 104, 106 and/or 108 (FIG. 1).

As indicated at bock 602, the method may include establishing at least first and second simultaneous connections between a transceiver of a mobile device and at least first and second LOBTs. For example, first and second simultaneous connections may be established between transceiver 131 (FIG. 1) and two or more of LOBTs 104, 106 and/or 108, e.g., as described above.

As indicated at block 604, establishing the first and second simultaneous connections may include directly communicating one or more messages between the transceiver and the first and second LOBTs to establish the first and second simultaneous connections. For example, transceiver 131 (FIG. 1) may communicate request and acknowledgement messages directly with LOBTs 104 and 106 (FIG. 1) to establish the simultaneous connection to LOBTs 104 and 106 (FIG. 1), e.g., as described above.

As indicated at block 606, establishing the first and second simultaneous connections may include communicating between the transceiver and a server a request to establish the first and second simultaneous connections. For example, transceiver 131 (FIG. 1) may transmit a simultaneous-connectivity request identifying LOBTs 104 and 106 (FIG. 1) to server 122 (FIG. 1), e.g., as described above.

As indicated at block 608, establishing the first and second simultaneous connections may include communicating messages between the server and the first and second LOBTs to establish the first and second simultaneous connections between the transceiver and the first and second LOBTs. For example, server 520 (FIG. 5) may communicate request 522 (FIG. 5) and acknowledgement 524 (FIG. 5) with LOBT 502 (FIG. 5) and server 520 (FIG. 5) may communicate request 536 (FIG. 5) and acknowledgement 528 (FIG. 5) with LOBT 504 (FIG. 5), e.g., as described above.

As indicated at block 610, the method may include communicating location information between the transceiver and the first and second LOBTs via the first and second simultaneous connections. For example, transceiver 131 (FIG. 1) may perform one or more location-estimation measurements with LOBTs 104 and 106 (FIG. 1), e.g., as described above.

As indicated at block 612, the method may include estimating a location of the mobile device based on the location information. For example, LCE 134 (FIG. 1) may estimate the location of device 102 (FIG. 1) based on the location-estimation measurements, e.g., as described above.

Figure 7:
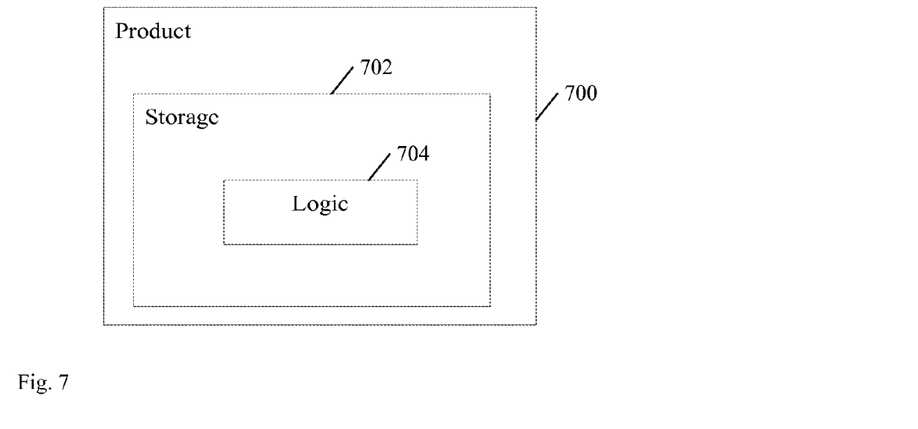
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 102 (FIG. 1), LCE 134 (FIG. 1), controller 135 (FIG. 1), server 122 (FIG. 1), LOBTs 104, 106 and/or 108 (FIG. 1), and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
at least one transceiver to simultaneously maintain a plurality of simultaneous Media-Access-Control (MAC) layer connections with a plurality of location origin beacon transceivers (LOBTs), said transceiver to communicate wireless communication signals of a plurality of Time of Flight (ToF) measurement exchanges with said plurality of LOBTs via said plurality of simultaneous MAC-layer connections, and to determine a plurality of location-related measurements based on the plurality of Time of Flight (ToF) measurement exchanges with said plurality of LOBTs, said transceiver is to establish a first MAC-layer connection with a first LOBT and to establish a second MAC-layer connection with a second LOBT, while the first MAC-layer connection with the first LOBT is still active; said transceiver is to transmit a first connectivity request to said first LOBT; said transceiver is to receive a first connectivity request acknowledgement from said first LOBT, in response to said first connectivity request; said transceiver is to transmit a second connectivity request to said second LOBT, after receiving said first connectivity request acknowledgement from said first LOBT; said transceiver is to receive a second connectivity request acknowledgement from said second LOBT, in response to said second connectivity request, wherein after receiving said first and second connectivity request acknowledgements said transceiver is to exchange with the first LOBT wireless communication signals of a first ToF measurement exchange of said plurality of ToF measurement exchanges and to exchange with the second LOBT wireless communication signals of a second ToF measurement exchange of said plurality of ToF measurement exchanges; and
a Location Calculation Entity (LCE) to receive said plurality of location-related measurements from said transceiver, and to determine a location of said apparatus based on said plurality of location-related measurements.

2. The apparatus of claim 1, wherein said first ToF exchange comprises transmission of a first message from the transceiver to the first LOBT and reception of a second message from the first LOBT at the transceiver, and the second ToF exchange comprises transmission of a first message from the transceiver to the second LOBT and reception of a second message from the second LOBT at the transceiver.

3. The apparatus of claim 1, wherein said transceiver is to exchange the wireless communication signals of the first ToF measurement exchange with the first LOBT over the first MAC-layer connection during a first time period, and to exchange the wireless communication signals of the second ToF measurement exchange with the second LOBT over the second MAC-layer connection during a second time period, the second time period at least partially overlapping the first time period.

4. The apparatus of claim 1, wherein the plurality of location-related measurements comprises a first ToF measurement based on the first ToF measurement exchange and a second ToF measurement based on the second ToF measurement exchange.

5. The apparatus of claim 1 comprising a controller to receive a request for location information including one or more attributes defining the requested location information, and to control said transceiver to communicate with said plurality of LOBTs based on said one or more attributes.

6. The apparatus of claim 1, wherein said plurality of MAC-layer connections includes connections over a plurality of different wireless communication frequencies.

7. The apparatus of claim 1, wherein said plurality of MAC-layer connections includes at least one bi-directional connection.

8. The apparatus of claim 1, wherein said plurality of LOBTs includes a plurality of LOBTs of a common LOBT type.

9. The apparatus of claim 8, wherein said plurality of LOBTs includes a plurality of Access Points.

10. The apparatus of claim 1, wherein said plurality of LOBTs includes LOBTs of at least two different LOBT types.

11. The apparatus of claim 10, wherein said plurality of LOBTs includes two or more different LOBTs selected from the group consisting of a Wireless-Local-Area-Network (WLAN) LOBT, a Bluetooth LOBT, and a cellular LOBT.

12. A system comprising:
a server comprising:
one or more antennas; and
at least one transceiver to receive from a mobile device a simultaneous-connectivity request identifying at least first and second location origin beacon transceivers (LOBTs) to be simultaneously connected to said mobile device, to establish a first connection between said first LOBT and said mobile device, to establish a second connection between said second LOBT and said mobile device, while said first connection is active, and to acknowledge to the mobile device the establishment of said first and second connections, said transceiver is to establish said first connection by transmitting to said first LOBT a first connectivity request identifying said mobile device and receiving a first connectivity request acknowledgement from said first LOBT, in response to said first connectivity request; said transceiver is to establish said second connection by transmitting to said second LOBT a second connectivity request identifying said mobile device and receiving a second connectivity request acknowledgement from said second LOBT, in response to said second connectivity request; said transceiver is to receive from said mobile device location information, which is based on Time of Flight (ToF) communications exchanged between said mobile device and said first and second LOBTs, and to estimate a location of said mobile device based on said location information, the location information comprising a first ToF measurement based on a first exchange of ToF messages over the first connection between the mobile device and the first LOBT and a second ToF measurement based on a second exchange of ToF messages over the second connection between the mobile device and the second LOBT.

13. The system of claim 12, wherein said first and second connections include connections over first and second different wireless communication frequencies.

14. The system of claim 12, wherein said at least first and second LOBTs include at least first and second LOBTs of a common LOBT type.

15. The system of claim 12, wherein said at least first and second LOBTs include at least first and second LOBTs of at least two different LOBT types.

* * * * *